US008260586B2

(12) United States Patent
Ecabert et al.

(10) Patent No.: US 8,260,586 B2
(45) Date of Patent: Sep. 4, 2012

(54) METHOD OF AND A SYSTEM FOR ADAPTING A GEOMETRIC MODEL USING MULTIPLE PARTIAL TRANSFORMATIONS

(75) Inventors: Olivier Ecabert, Aachen (DE); Jochen Peters, Aachen (DE); Juergen Weese, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 801 days.

(21) Appl. No.: 12/067,841

(22) PCT Filed: Sep. 20, 2006

(86) PCT No.: PCT/IB2006/053396
§ 371 (c)(1),
(2), (4) Date: Aug. 15, 2008

(87) PCT Pub. No.: WO2007/034425
PCT Pub. Date: Mar. 29, 2007

(65) Prior Publication Data
US 2009/0037154 A1 Feb. 5, 2009

(30) Foreign Application Priority Data

Sep. 23, 2005 (EP) .................................... 05108822

(51) Int. Cl.
*G06F 7/60* (2006.01)
*G06F 17/10* (2006.01)
(52) U.S. Cl. ............................. 703/2; 382/173; 345/419
(58) Field of Classification Search .................. 703/6, 2
See application file for complete search history.

(56) References Cited

U.S. PATENT DOCUMENTS

| 5,633,951 | A | * | 5/1997 | Moshfeghi | 382/154 |
|---|---|---|---|---|---|
| 5,926,568 | A | * | 7/1999 | Chaney et al. | 382/217 |
| 6,106,466 | A | * | 8/2000 | Sheehan et al. | 600/443 |
| 6,204,860 | B1 | * | 3/2001 | Singh | 345/420 |
| 6,678,642 | B1 | * | 1/2004 | Budge | 703/2 |
| 6,816,607 | B2 | | 11/2004 | O'Donnell et al. | |
| 7,764,838 | B2 | * | 7/2010 | Jolly et al. | 382/190 |
| 7,773,806 | B2 | * | 8/2010 | Cremers et al. | 382/173 |
| 7,804,997 | B2 | * | 9/2010 | Geng et al. | 382/154 |
| 8,121,370 | B2 | * | 2/2012 | Dewaele | 382/128 |

(Continued)

FOREIGN PATENT DOCUMENTS

WO    2004036500 A2    4/2004

(Continued)

OTHER PUBLICATIONS

Bruijne et al, "Adapting Active Shape Models for 3D Segmentation of Tubular Structures in Medical Images", IPMI 2003, LNCS 2732, pp. 136-147, 2003.*

(Continued)

*Primary Examiner* — Mary C Jacob

(57) ABSTRACT

The invention relates to a method (100) of adapting a geometric model to an image data comprising determining a first partial transformation for mapping a first part of the geometric model into the image data and a second partial transformation for mapping a second part of the geometric model into the image data. By determining the first partial transformation of the first part of the geometric model and the second partial transformation of the second part of the geometric model, the geometric model can assume more shapes and therefore can be more accurately adapted to an object comprised in the image data.

12 Claims, 5 Drawing Sheets

U.S. PATENT DOCUMENTS

Figure 1:
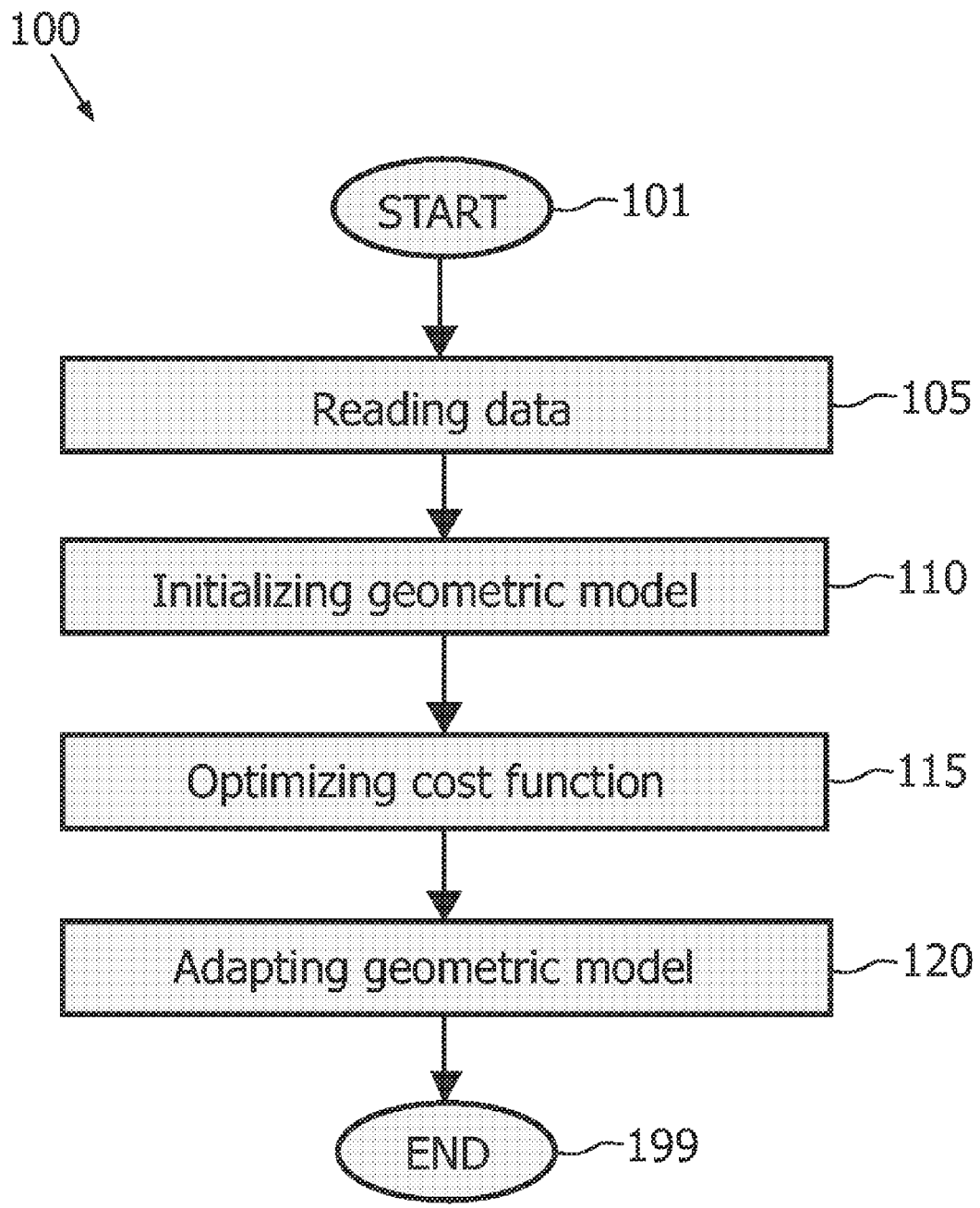

| | | | |
|---|---|---|---|
| 2003/0160786 A1* | 8/2003 | Johnson | 345/419 |
| 2005/0254708 A1* | 11/2005 | Jolly et al. | 382/173 |
| 2006/0098897 A1* | 5/2006 | Dewaele | 382/294 |
| 2006/0110071 A1* | 5/2006 | Ong et al. | 382/294 |

FOREIGN PATENT DOCUMENTS

| | | | |
|---|---|---|---|
| WO | 2004053792 A1 | 6/2004 | |
| WO | 2005008587 A1 | 1/2005 | |
| WO | 2006016317 A2 | 2/2006 | |
| WO | 2006085248 A1 | 8/2006 | |

OTHER PUBLICATIONS

Kaus et al, "Automated 3-D PDM Construction from Segmented Images Using Deformable Models", IEEE Transactions on Medical Imaging, vol. 22 No. 8, Aug. 2003.*

Audette et al, "An Algorithmic Overview of Surface Registration Techniques for Medical Imaging", Medical Image Analysis 4, (2000) 201-217.*

Mitchell et al, "Multistage Hybrid Active Appearance Model Matching: Segmentation of Left and Right Ventricles in Cardiac MR Images", IEEE transactions on Medical Imaging, vol. 20, No. 5, May 2001.*

Jurgen Weese, et al: Shape Constrained Deformable Models for 3D Medical image Segmentation, Published in Proc. IPMI 2001, LNCS 2082, Springer-Verlag, pp. 380-387, 2001.

O. Ecabert, et al: Modeling Shape Variability for Full Heart Segmentation in Cardiac Computed-tomography Images, Proceedings of SPIE—Medical Imaging 2006: Image Processing, vol. 6144, Mar. 15, 2006, pp. 1-12.

P. Thomas Fletcher, et al: Deformable M-REP Segmentation of Object Complexes, Biomedical Imaging 2002, Proceedings, 2002 IEEE International Symposium on Jul. 7-10, 2002, Piscataway, NJ, USA, IEEE, Jul. 7, 2002, pp. 26-29.

Stephen M. Pizer, et al: Multiscale Medial Shape-Based Analysis of Image Objects, Proceedings of the IEEE, vol. 91, No. 10, Oct. 2003, pp. 1670-1679.

T. F. Cootes, et al: The Use of Active Shape Models for Locating Structures in Medical Images, Image and Vision Computing, vol. 12, No. 6, Jul. 1994, pp. 355-366.

Tim McInerney, et al: Deformable Models in Medical Image Analysis: A Survey, Medical Image Analysis, 1 (2): 1996, pp. 91-108.

* cited by examiner

METHOD OF AND A SYSTEM FOR ADAPTING A GEOMETRIC MODEL USING MULTIPLE PARTIAL TRANSFORMATIONS

This invention relates to an adaptation method of adapting a geometric model to an image data.

The invention further relates to an adaptation system for adapting a geometric model to an image data.

The invention further relates to an acquisition system for acquiring an image data comprising said adaptation system.

The invention further relates to a workstation comprising said adaptation system.

The invention further relates to a computer program product to be loaded by a computer arrangement, comprising instructions for adapting a geometric model to an image data.

An embodiment of the adaptation method of the kind described in the opening paragraph is used for geometric model initialization and/or adaptation. In this method a geometric model undergoes rigid transformations combined with scaling or an affine transformation to segment an object in the image data. Model-based segmentation has proven to be very efficient for rigid and/or simple organs and has found many clinical applications, for example, to radiotherapy planning (RTP). However, segmenting more complex organs like the heart still does not produce satisfactory results. This is because rigid transformations combined with scaling and affine transformations are not sufficiently flexible to cope with the variability of complex objects. While certain parts of the model may adapt well to objects comprised in the image data, other parts may be adapted less accurately.

Another embodiment of the adaptation method of the kind described in the opening paragraph is described in the article "Shape constrained deformable models for 3D medical image segmentation" by J. Weese, V. Pekar, M. Kaus, C. Lorenz, S. Lobregt, and R. Truyen, published in Proc. IPMI, 380-387, Springer Verlag, 2001, hereinafter referred to as Ref. 1. This article describes a method employing a geometric model represented by a triangular mesh. The cost function based on the total energy of the geometric model is defined as a sum of an internal energy term, which depends on the locations of the vertices relative to each other, and of an external energy term, which depends on the locations of the triangles relative to their corresponding detected locations in the image. In the internal energy term, the relative locations of triangle edges are compared to relative locations of respective triangle edges of a reference shape-based model. The reference shape-based model is allowed to be translated, rotated and/or scaled in order to minimize the cost function of the geometric model. As in the preceding case, the category of rigid transformations combined with scaling is not sufficient to describe variability of complex objects. Hence, the adapted geometric model obtained by minimizing the cost function of the mesh often comprises problematic areas, where distances between the surfaces of the adapted geometric model and the surfaces of an accurate reference segmentation of the object of interest may be unacceptably large.

It is an object of the invention to provide an adaptation method of the kind described in the opening paragraph that reduces the problematic areas in adapted geometric models.

The object of the invention is achieved in that the adaptation method of adapting a geometric model to an image data comprises determining a first partial transformation for mapping a first part of the geometric model into the image data and a second partial transformation for mapping a second part of the geometric model into the image data.

By determining a first partial transformation of the first part of the geometric model and by determining a second partial transformation of the second part of the geometric model, the geometric model can assume more shapes and therefore can be more accurately adapted to an object comprised in the image data. The first part and the second part of the geometric model can be deformed fairly independently of each other except for the transition regions between adjacent parts. Thus, the adaptation method of the current invention removes some constraints and allows matching the geometric model with more flexibility. Consequently, the adaptation method of the current invention reduces the problematic areas in complex geometric models.

In a further embodiment of the adaptation method according to the current invention, the adaptation method comprises a consistency step for maintaining consistency of the adapted geometric model in a transition region between the first part and the second part. This can be achieved by finding suitable extensions of the partial transformations and constructing a global transformation satisfying a consistency requirement. The consistency step helps to avoid creating a gap and/or an inconsistent overlap at the transition between two regions, which otherwise could happen if, e.g., the first and the second partial transformation yield a constricted first part and a constricted second part. Occurrences of such inconsistencies are penalized by the cost function.

In a further embodiment of the adaptation method according to the current invention, a cost function is a functional of the first partial transformation and of the second partial transformation, and the first partial transformation and the second partial transformation are determined by optimizing the cost function. Determining the first transformation and the second transformation may be carried out automatically. There are many cost functions, which can be used for determining the partial transformations. For example, a cost function may be defined by a distance of structures detected in the image data to the adapted geometric model.

In a further embodiment of the adaptation method according to the current invention, the transition region is comprised in the intersection of the first part and of the second part, and the consistency step comprises determining the global transformation in the transition region on basis of the first partial transformation and of the second partial transformation. For example, the transition region may be identical with the intersection of the first part and of the second part. Alternatively the transition region can be determined on basis of a training set of images. The consistency of the global transformation may be achieved, for example, by determining the global transformation in the transition region by a weighted average of the first partial transformation and of the second partial transformation. Alternatively, a non-linear function of the first partial transformation and of the second partial transformation can be used.

In a further embodiment of the adaptation method according to the current invention, the adaptation method further comprises constructing a global transformation for mapping the geometric model into the image data using the first partial transformation and the second partial transformation. Outside the transition regions, the global transformation is identical to the respective partial transformation. In a transition region the global transformation is defined as a linear combination of the partial transformations defined in said transition region. The global transformation may be used to initialize and/or to adapt the geometric model to the image data.

In a further embodiment of the adaptation method according to the current invention, the cost function is a functional of the global transformation. This embodiment is suitable for use with any cost function for optimizing a global transformation. Many of such cost functions are available.

In a further embodiment of the adaptation method according to the current invention, the consistency step comprises optimizing a cost function comprising an internal energy contribution from a region of the geometric model comprised in the transition region and the internal energy contribution is determined on basis of a first internal energy contribution using the first partial transformation and of a second internal energy contribution using the second partial transformation.

In a further embodiment of the adaptation method according to the current invention, the second part of the geometric model comprises a tubular structure and the second partial transformation is defined on basis of a shaping partial transformation for shaping a centerline of the tubular structure and/or of a scaling partial transformation for scaling the radius of a cross-section of the tubular structure. The heart is a complex organ comprising a plurality of structures such as chambers and ventricles, and is directly connected with blood vessels. Therefore modeling a heart by means of a geometric model typically involves modeling fragments of the neighboring blood vessels and a geometric model useful for adaptation to an image data comprising a heart should comprise parts for modeling the blood vessels. However, the geometrical properties of blood vessels are very different from those of a heart. The adaptation method of the current invention advantageously allows taking these differences into account.

The skilled person will understand that the described partial transformations serve the purpose of illustrating the invention and by no means limit the scope of the claims. The skilled person will appreciate the fact that many other partial transformations are available.

In a further embodiment of the adaptation method according to the current invention, the first partial transformation is an affine partial transformation. An affine transformation is a combination of a linear transformation and a translation. Affine transformations are easy to implement, useful for fast computations, and much more general than rigid transformations or rigid transformations combined with scaling.

In a further embodiment of the adaptation method according to the current invention, the adaptation method further comprises a segmenting step for segmenting the image data. Adapting complex geometric models to the image data contributes as such to delineating components of an organ modeled by the geometric model. Furthermore, applying the adaptation method to multiple objects comprised in an image data allows a medical practitioner to delineate said multiple objects. Altogether, the adaptation method of the current invention allows to better visualizing an image data and enables a medical practitioner to extract quantitative information such as geometric parameters of objects comprised in the image data.

In an embodiment of the adaptation method according to the invention, the geometric model is based on a mesh comprising a plurality of vertices. In a further embodiment of the adaptation method according to the invention, the mesh is a polygonal mesh such as a triangular mesh used in Ref. 1. A polygonal mesh represents a surface of the modeled objects. A polygonal mesh is relatively easy to implement. Adaptation of a polygonal mesh rarely requires excessive computing time. Alternatively geometric models can be based on tetrahedral meshes. The skilled person will understand that there are many geometric models that can be adapted using the adaptation method of the current invention. The meshes used in the description of the embodiments of the current invention are for illustration purpose only and do not limit the scope of the claims.

It is a further object of the invention to provide an adaptation system of the kind described in the opening paragraph that reduces the problematic areas in adapted geometric models. This is achieved in that the adaptation system for adapting a geometric model to an image data comprises a determining unit for determining a first partial transformation for mapping a first part of the geometric model into the image data and a second partial transformation for mapping a second part of the geometric model into the image data.

It is a further object of the invention to provide an image acquisition system of the kind described in the opening paragraph that reduces the problematic areas in adapted geometric models. This is achieved in that the image acquisition system comprises an adaptation system for adapting a geometric model to an image data, the adaptation system comprising determining a first partial transformation for mapping a first part of the geometric model into the image data and a second partial transformation for mapping a second part of the geometric model into the image data.

It is a further object of the invention to provide workstation of the kind described in the opening paragraph that reduces the problematic areas in adapted geometric models. This is achieved in that the workstation comprises an adaptation system for adapting a geometric model to an image data, the adaptation system comprising determining a first partial transformation for mapping a first part of the geometric model into the image data and a second partial transformation for mapping a second part of the geometric model into the image data.

It is a further object of the invention to provide a computer program product of the kind described in the opening paragraph that reduces the problematic areas in adapted geometric models. This is achieved in that the computer program product to be loaded by a computer arrangement, comprising instructions for adapting a geometric model to an image data, the computer arrangement comprising a processing unit and memory, the computer program product, after being loaded, providing said processing unit with the capability to determine a first partial transformation for mapping a first part of the geometric model into the image data and a second partial transformation for mapping a second part of the geometric model into the image data.

Modifications and variations thereof, of the adaptation system, of the image acquisition system, of the workstation, and/or of the computer program product, which correspond to modifications of the adaptation method and variations thereof, being described, can be carried out by a skilled person on basis of the present description.

The adaptation method of the present invention is useful for adapting geometric models to an image data. The image data can be routinely generated nowadays by various data acquisition modalities such as Magnetic Resonance Imaging (MRI), Computed Tomography (CT), Ultrasound (US), Positron Emission Tomography (PET), and Single Photon Emission Computed Tomography (SPECT).

Figure 2:
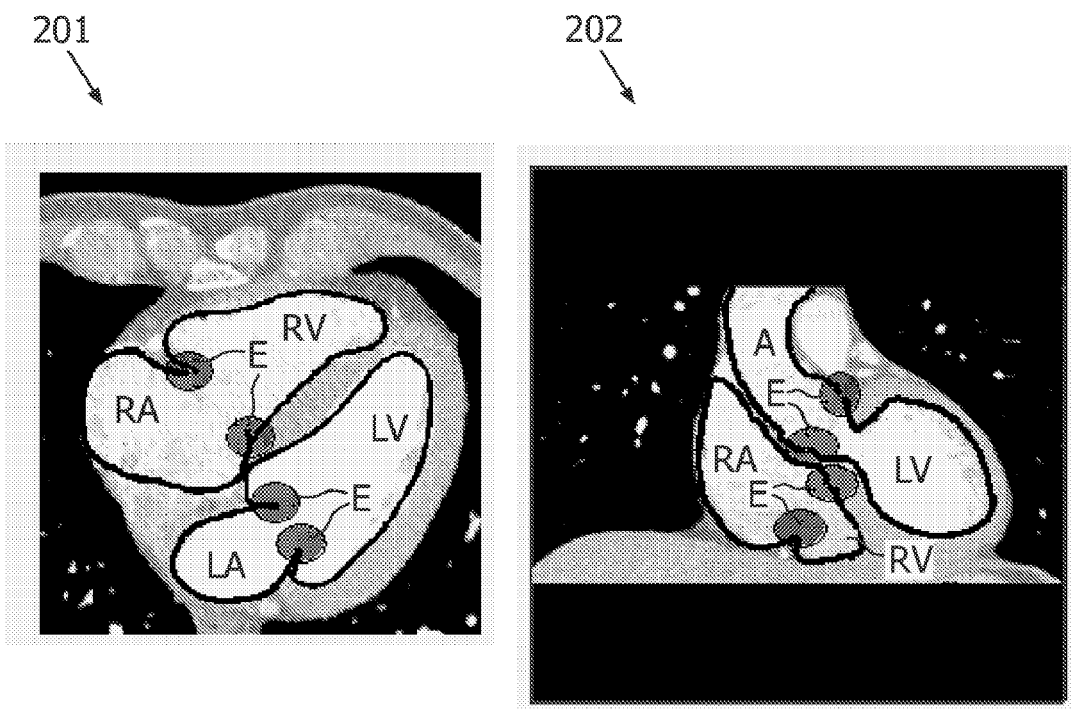
Figure 3:
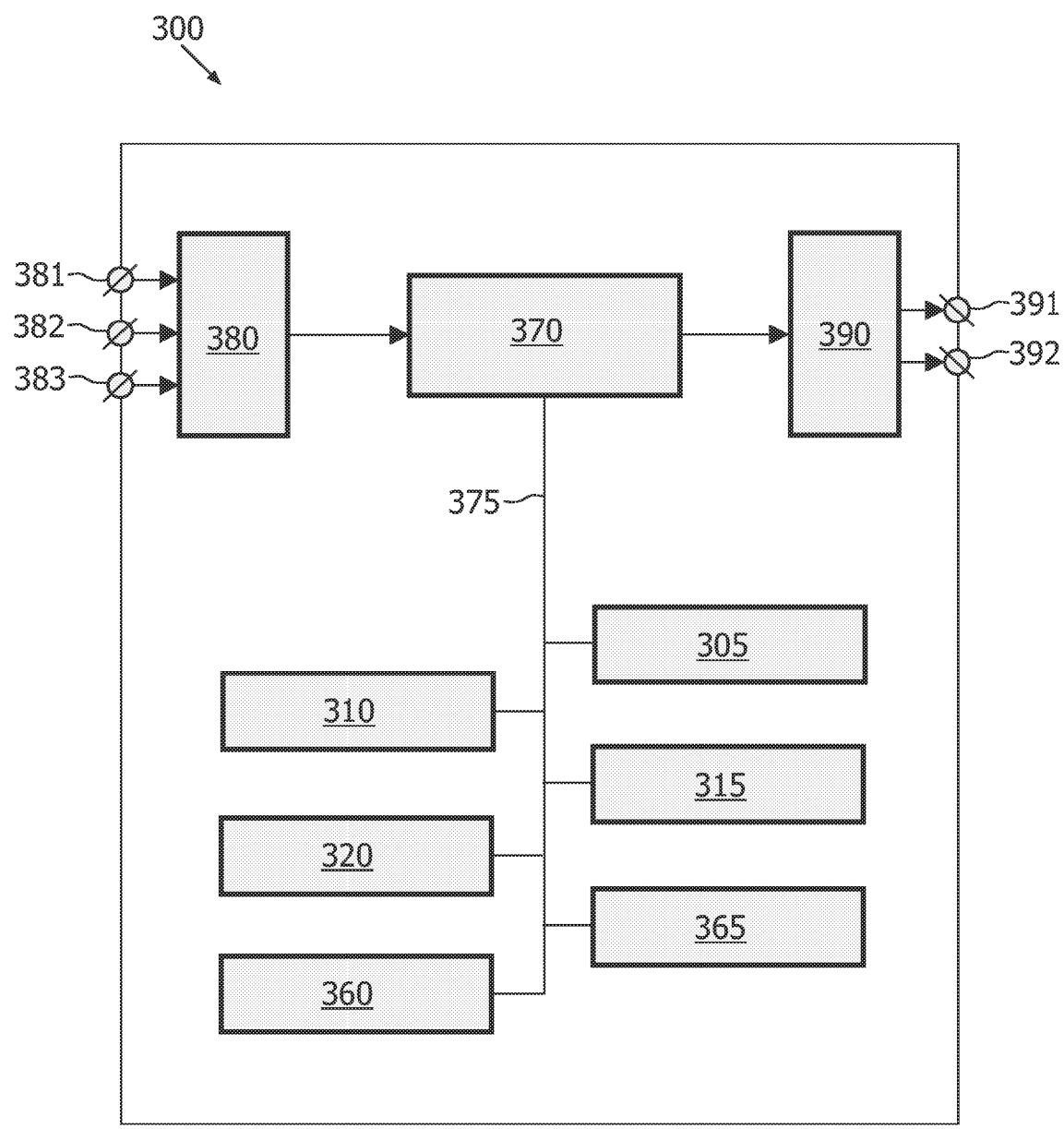
Figure 4:
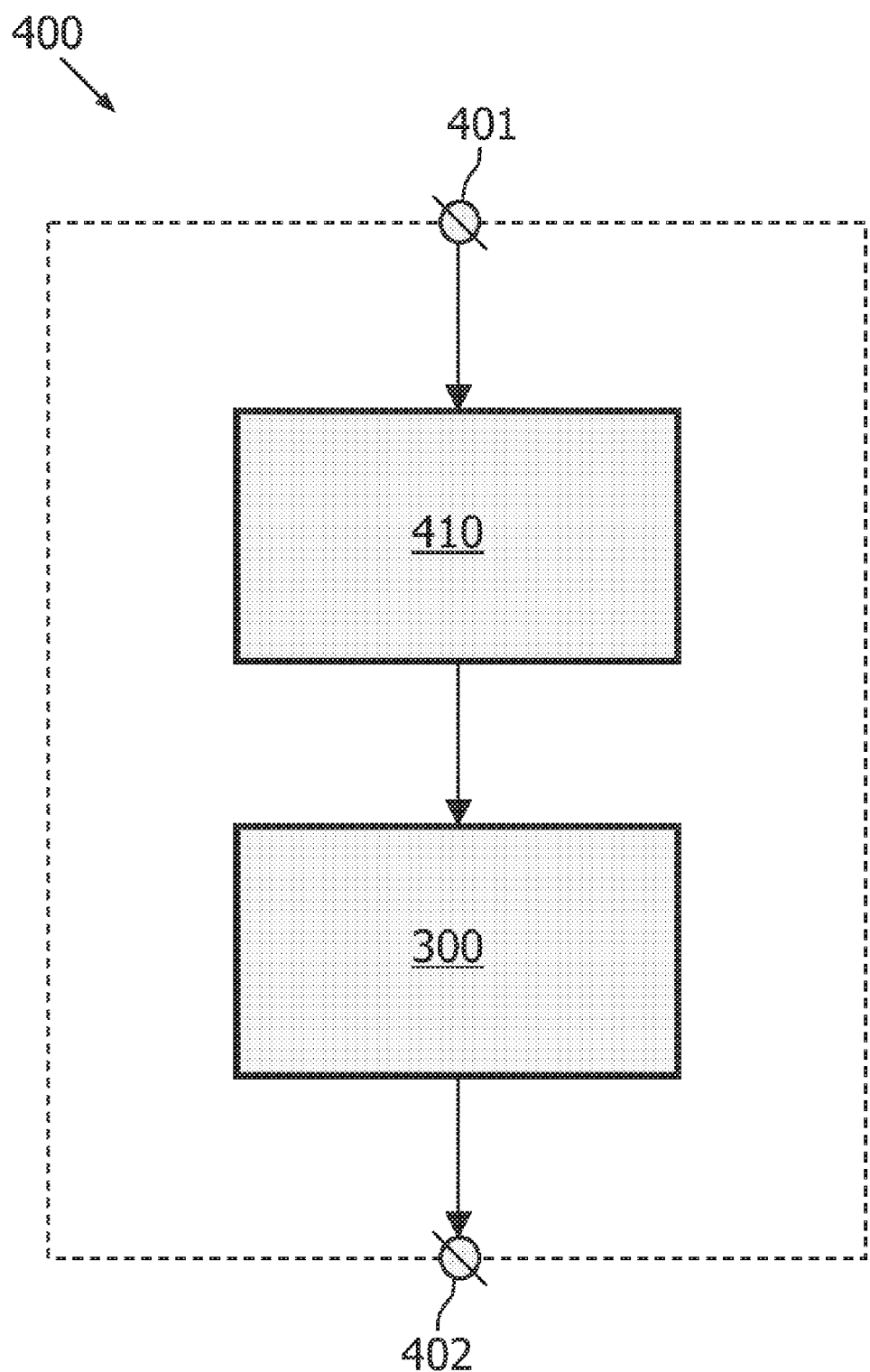

These and other aspects of the adaptation method, of the adaptation system, of the image acquisition system, of the workstation, and of the computer program product according to the invention will become apparent from and will be elucidated with respect to the implementations and embodiments described hereinafter and with reference to the accompanying drawings, wherein:

FIG. 1 shows a simplified flowchart of an exemplary embodiment of the adaptation method;

FIG. 2 schematically shows exemplary parts of a geometric model;

FIG. 3 shows a block diagram of an embodiment of the adaptation system;

FIG. 4 schematically shows an embodiment of the image acquisition system; and

Figure 5:
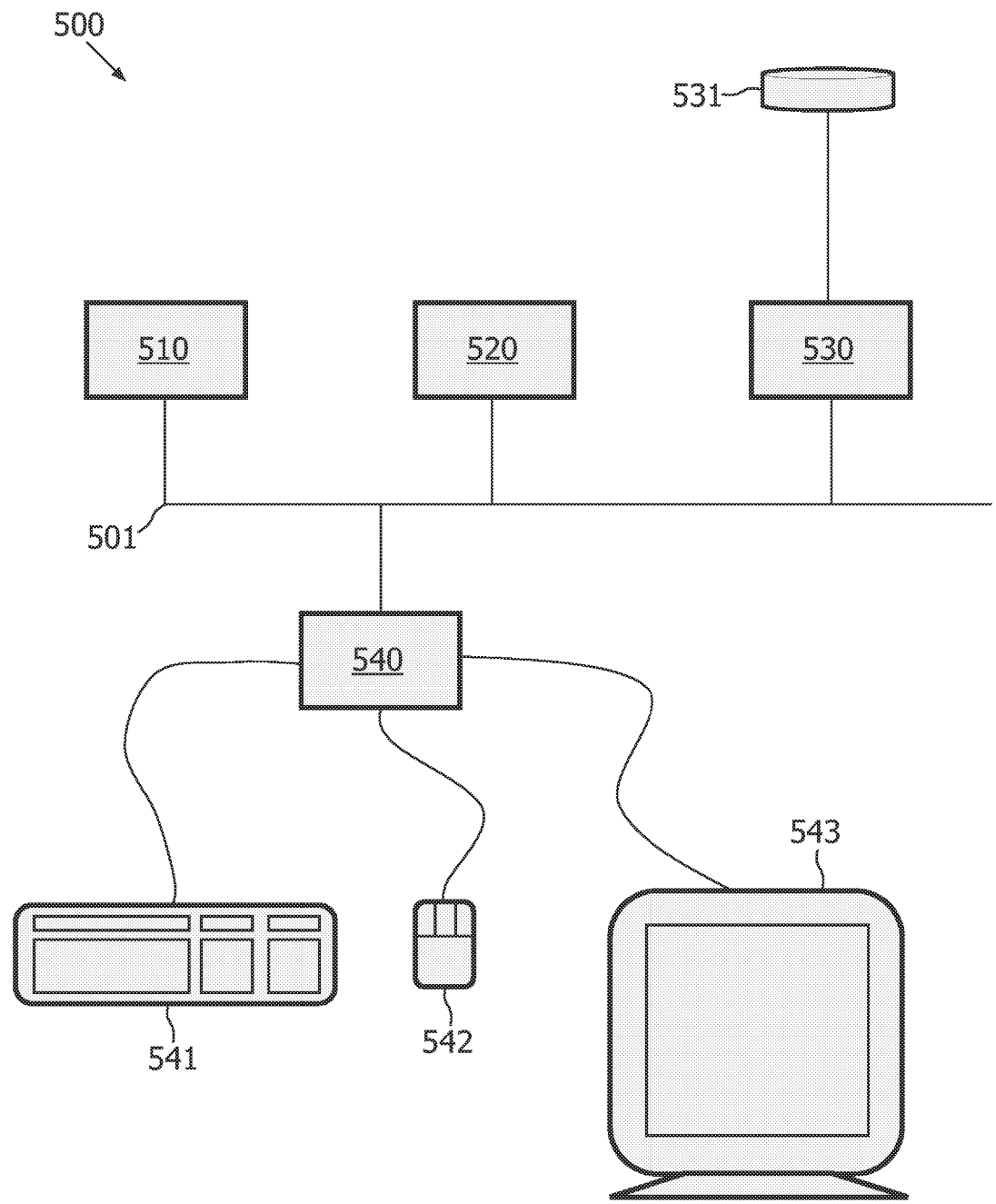

FIG. 5 schematically shows an embodiment of the workstation.

Same reference numerals are used to denote corresponding parts throughout the figures.

FIG. 1 shows a simplified flowchart of an exemplary embodiment of the adaptation method 100 of adapting a geometric model to an image data, the adaptation method comprising:

a reading step 105 for reading the image data and the geometric model data;

an initializing step 110 for initializing the geometric model; and an optimizing 115 step for optimizing a cost function to determine parameters of the global transformation.

In an embodiment of the adaptation method 100 according to the current invention, the adaptation method also comprises:

an adapting step 120 for adapting the geometric model to the image data using the constructed global transformation.

With further reference to FIG. 1 after the start step 101 the method continues to the reading step 105 for reading the image data and the geometric model data. The geometric model data comprises a plurality of parts of the geometric model. The parts here form a partition of the geometric model. The geometric model is initialized in the initializing step 110. For example, the geometric model may be placed in the image near an object in the image data to which the geometric model is to be adapted. Optionally, the geometric model may be further rotated, translated, and/or scaled to match the object to which the geometric model is to be adapted. After the initializing step 110 the method continues to the optimizing step 115. In the optimizing step 115 a cost function is optimized and the optimal parameters of the partial transformations here also satisfying a consistency condition are found. Then the method continues to the adapting step 120, wherein the geometric model is adapted to the image data using the global transformation defined on basis of the partial transformations, and terminates with step 199. Alternatively the method terminates after the optimizing step 115.

FIG. 2 schematically shows exemplary parts of a geometric model of a heart in an axial view 201 and in a coronal view 202. Here the parts of the model comprise the right atrium RA, the left atrium LA, the right ventricle RV, the left ventricle LV, and the aorta A. The shaded ellipses E indicate transition regions between the parts. FIG. 2 illustrates that within the same organ, structures of different nature may occur. The left ventricle LV and the right ventricle RV are expected to vary in size and location while the ascending aorta A varies in the bending radius of the centerline and in the cross-section. Moreover, the location and size of the two ventricles relative to each other may also vary. Thus different partial transformation can advantageously be applied to the left ventricle LV, to the right chamber RV, and to the aorta A.

One possibility to avoid overconstraining the deformability of a geometric model is to adapt a first part of the geometric model and a second part of the geometric model to the image data independently of each other. The problem with this approach lies in assuring consistency of the whole geometric model. If the two parts are close to each other and/or connected with each other the shape and size of the first part influences the shape and size of the second part to some extent, e.g. the location of left ventricle is related to the location of the aorta. A complex model of an entire heart is taking the dependencies of the parts of the heart into account while a collection of independent models of atria, of ventricles, and of an aorta is not taking the dependencies of the modeled parts into account. Therefore it is advantageous to use a complex model for an organ such as a heart.

In order to maintain consistency of the adapted geometric model, a kind of interaction between partial transformations at the transition regions shown in FIG. 2 by shaded ellipsoids E is required.

In an embodiment of the adaptation method 100 of the current invention, a global transformation of the geometric model is used. This global transformation is constructed on basis of the partial transformations for transforming parts of the geometric model. To this end, if the parts are mutually disjoint or if they do not overlap sufficiently, each partial transformation must be extended to a larger domain comprising transition regions adjacent to the part transformed by the partial transformation. For example, if the partial transformation is a scaling transformation, a rigid transformation or an affine transformation, such partial transformation can be naturally extended to all parts of the geometric model. If a partial transformation can be locally approximated by polynomial or trigonometric series, these polynomial or trigonometric series may be used to define an extension of the partial transformation. The skilled person will understand that there are several other ways to extend a partial transformation is such a way that the domain of the extension of the partial transformation comprises transition regions adjacent to the part transformed by the partial transformation. For the sake of simplicity, hereinafter the extension of a partial transformation $T_k$ of $k^{th}$ part $P_k$ of the geometric model will be referred to as the partial transformation and also will be denoted as $T_k$.

Once the parts of a geometric model sufficiently overlap, they can be used to define the global transformation. For example, if the geometric model is represented by a mesh of vertices each vertex x may be assigned a set of weights, each weight corresponding to a partial transformation $T_k$ of $k^{th}$ part of the geometric model. Similarly, if the geometric model is represented by a triangular mesh each triangle center x may be assigned a set of weights, each weight corresponding to a partial transformation $T_k$ of $k^{th}$ part of the geometric model. The global transformation T is defined as $$T(x) = \sum_{k: w_k > 0} w_k(x) T_k(x). \quad [1]$$

When x is comprised in $k^{th}$ part and is not comprised in any transition region then the weight $w_k(x)=1$ while other weights $w_l(x)=0$ for $l \neq k$. Hence $T(x)=T_k(x)$. When x is comprised in a transition region overlapping with $k^{th}$ part, then the weight $w_k(x) \geq 0$. The sum of all weights assigned to x is 1. Typically, but not always, the deeper a vertex x is located inside a $k^{th}$ part $P_k$, the larger the weight $w_k(x)$ and thus the larger the contribution of the partial transformation $T_k$ to the global transformation T at x. The contribution of the partial transformation $T_k$ to the global transformation T at x is restricted to some reasonably close environment of the $k^{th}$ part, which can be determined on basis of a set of training images. The weights $w_k(x)$ are preferably comprised in the geometric model of the current invention. Alternatively, the weight $w_k(x)$ may be computed on basis of the plurality of parts of the geometric model. For example, if x is a vertex comprised in two parts, say $P_k$ and $P_l$, then a border β between the two parts may be defined. The weight $w_k(x)$ may be then defined as $w_k(x)=d(x, β)/\max\{d(y, β): y \in P_k \cap P_l\}$ and $w_l(x)=1-w_k(x)$ where $d(y, β)$ is a distance between y and β. Preferably, the border is chosen in such way that $w_k(x)=w_l(x)$ for $x \in \beta$.

The global transformation T depends on parameters of the partial transformations $T_k$. Each partial transformation may have a different set of parameters and/or different parameter values. For example, parameters of translations are the components of the translation vector, a parameter of a scaling transformation is the scaling factor, and parameters of a linear transformation are the elements of the matrix of the linear transformation.

The type of a partial transformation $T_k$ suitable for transforming a part $P_k$ may be learned from adapting the geometric model to training image data and can be comprised in the geometric model. Alternatively, the definition of partial transformation may be comprised in an implementation of the method. Optionally, the user may be allowed to interactively select the type of a partial transformation.

The parameters of a global transformation T can be computed in the optimizing step 115 by optimizing a cost function such as the total energy of a triangular mesh. Details of the optimization method can be found in the prior art, for example, in Ref. 1, which is herewith included by reference. The embodiment of the adaptation method 100 just described above and illustrated in FIG. 1 is especially useful for initializing complex geometric models. There is a large number of segmentation algorithms for optimizing a cost function that can be employed with the adaptation method of the current invention. The global transformation obtained by minimizing a cost function may be advantageously used to initialize the model.

In a further embodiment of the adaptation method 100 according to the current invention, the adaptation method of Ref. 1 is advantageously arranged to be used with the geometric model of the current invention. In this adaptation method the cost function comprises an external energy term $E_{ext}$ and an internal energy term $E_{int}$. The internal energy term of Ref. 1 may be written as $$E_{int} = \sum_{\text{vertices } i} F(x_i, N(x_i), T(m)), \quad [2]$$

where $N(x_i)$ is a neighborhood comprising vertices $x_j$ around a vertex $x_i$, m is the set of vertices $m_i$ of a reference shape-based model, T is a global transformation of the shape-based model, and $F(x_i, N(x_i), T(m))$ is a contribution of vertex $x_i$ to the internal energy [2]. In the energy-minimizing frameworks the contribution F is typically implemented as a quadratic function of relative vertex displacements:

$$F(x_i, N(x_i), T(m)) = \sum_{\text{vertices } j \in N(x_i)} (x_i - x_j - (T(m_i) - T(m_j)))^2. \quad [3]$$

In the present embodiment the consistency of the adapted geometric model is assured by redefining the contribution of $i^{th}$ vertex $x_i$ to the internal energy as $$F(x_i, N(x_i), T(m)) = \sum_{k: w_k(x_i) > 0} w_k(x_i) \cdot F(x_i, N(x_i), T_k(m)), \quad [4]$$

where $w_k(x_i)$ is a weight of the contribution $F(x_i, N(x_i), T_k(m))$ of $i^{th}$ vertex $x_i$ to the internal energy [4] from a $k^{th}$ part $P_k$. These weights are defined using the same principles as previously described. In view of Eq. [3], partial transformations are preferably extended to the entire geometric model. Alternatively, a neighborhood $N(x_i)$ around a vertex $x_i$ from a $k^{th}$ part $P_k$ must be defined in such a way that $N(x_i)$ comprises vertices only from the $k^{th}$ part $P_k$ and from the transition regions adjacent to the $k^{th}$ part $P_k$.

Optimization of the geometric model in such energy minimizing frameworks as described in the above embodiment is, e.g. done in two steps, which may then be iterated. First, the parameters of the partial transformations $T_k$ are optimized with respect to the initial configuration of vertices of the geometric model on basis of minimizing the total energy of the geometric model. Second, the vertex coordinates $x_i$ are computed to optimize the total energy using the partial transformations $T_k$ determined in the first step. The optimized vertices $x_i$ define the adapted geometric model. For details see Ref. 1, especially Section 2.4.

In a particular embodiment of the adaptation method according to the invention, in the optimization, in the first optimization step, the internal energy term $E_{int}$ of the geometric model is given an infinite weight. This can practically be implemented by weighing the internal energy term much higher than the external energy term in the expression of the cost function. This is equivalent to freezing the displacements between vertices $x_i$ and the transformed vertices $T_k(m_i)$ of the reference shape-based model while minimizing the external energy of a "rigid" geometric model attracted to the features detected in the image. The only degrees of freedom are the parameters of the partial transformations. In the second optimization step, as described above, the vertex coordinates $x_i$ are optimized using the partial transformations $T_k$ determined in the first step.

To perform a robust, but nevertheless fast initialization, the transformations might first be restricted to one or several rigid transformations. Then this can be used as an initialization for more complex transformations, e.g. multiple affine transformations.

This optimization procedure might as well be applied even without using partial transformations, i.e. might as well be used with the global transformations of the prior art as they are described, e.g. in Ref. 1.

The order in the described embodiments of the method of the current invention is not mandatory, the skilled person may change the order of steps or perform steps concurrently using threading models, multi-processor systems or multiple processes without departing from the concept as intended by the present invention. Optionally, two steps of the method of the current invention can be combined into one step. Optionally, a step of the adaptation method 100 of the current invention can be split into a plurality of steps.

FIG. 3 schematically shows an embodiment of the adaptation system 300 for adapting a geometric model to an image data, the adaptation system 300 comprising:

a reading unit 305 for reading the image data and the geometric model data;

an initializing unit 310 for initializing the geometric model; and an optimizing unit 315 for optimizing a cost function to determine parameters of the global transformation.

In an embodiment of the adaptation system 300 according to the current invention, the adaptation method also comprises:

an adapting step unit 320 for adapting the geometric model to the image data using the constructed global transformation;

a segmentation unit 360 for segmenting the image data;

a user interface 365 for communicating with the detection system 300.

In the embodiment of the adaptation system 300 shown in FIG. 3, there are three input connectors 381, 382 and 383 for the incoming data. The first input connector 381 is arranged to receive data incoming from data storage such as a hard disk, a magnetic tape, flash memory, or an optical disk. The second input connector 382 is arranged to receive data incoming from a user input device such as a mouse or a touch screen. The third input connector 383 is arranged to receive data incoming from a user input device such as a keyboard. The input connectors 381, 382 and 383 are connected to an input control unit 380.

In the embodiment of the adaptation system 300 shown in FIG. 3, there are two output connectors 391 and 392 for the outgoing data. The first output connector 391 is arranged to output the data to data storage such as a hard disk, a magnetic tape, flash memory, or an optical disk. The second output connector 392 is arranged to output the data to a display device. The output connectors 391 and 392 receive the respective data via an output control unit 390.

The skilled person will understand that there are many ways to connect input devices to the input connectors 381, 382 and 383 and the output devices to the output connectors 391 and 392 of the adaptation system 300. These ways comprise, but are not limited to, a wired and a wireless connection, a digital network such as a Local Area Network (LAN) and a Wide Area Network (WAN), the Internet, a digital telephone network, and an analogue telephone network.

In an embodiment of the adaptation system 300 according to the invention, the adaptation system 300 comprises a memory unit 370. The memory unit 370 is arranged to receive an input data from external devices via any of the input connectors 381, 382, and 383 and to store the received input data in the memory unit 370. Loading the data into the memory unit 370 allows a quick access to relevant data portions by the units of the adaptation system 300. The input may data comprise, but is not limited to, the image data. The memory unit 370 can be implemented by devices such as a Random Access Memory (RAM) chip, a Read Only Memory (ROM) chip, and/or a hard disk. Preferably, the memory unit 370 comprises a RAM for storing the image dataset. The memory unit 370 is also arranged to receive data from and to deliver data to the units of the adaptation system 300 comprising the reading unit 305, the initializing unit 310, the optimizing unit 315, the adapting step unit 320, the segmentation unit 360, and the user interface 365, via the memory bus 375. The memory unit 370 is further arranged to make the data available to external devices via any of the output connectors 391 and 392. Storing the data from the units of the adaptation system 300 in the memory unit 370 advantageously improves the performance of the units of the adaptation system 300 as well as the rate of transfer of data from the units of the adaptation system 300 to external devices.

Alternatively, the adaptation system 300 does not comprise the memory unit 370 and the memory bus 375. The input data used by the adaptation system 300 is supplied by at least one external device, such as external memory or a processor, connected to the units of the adaptation system 300. Similarly, the output data produced by the adaptation system 300 is supplied to at least one external device, such as external memory or a processor, connected to the units of the adaptation system 300. The units of the adaptation system 300 are arranged to receive the data from each other via internal connections or via a data bus.

In a further embodiment of the adaptation system 300 according to the invention, the adaptation system 300 comprises a user interface 365 for communicating with the adaptation system 300. The user interface 365 comprises a display unit for displaying data to the user and a selection unit for making selections. Combining the adaptation system 300 with a user interface 365 allows the user to communicate with the adaptation system 300. The user interface 365 is further arranged to display the geometric model and a view rendered from the image data. Optionally, the user interface can comprise a plurality of modes of operation of the adaptation system 300 indicating the cost function employed in the adaptation. The skilled person will understand that more functions can be advantageously implemented in the user interface 365 of the adaptation system 300.

Alternatively, the adaptation system can employ an external input device and/or an external display connected to the adaptation system 300 via the input connectors 382 and/or 383 and the output connector 392. The skilled person will also understand that there exist many user interfaces that can be advantageously comprised in the adaptation system 300 of the current invention.

The adaptation system 300, such as the one shown in FIG. 3, of the invention may be implemented as a computer program product and can be stored on any suitable medium such as, for example, magnetic tape, magnetic disk, or optical disk. This computer program can be loaded into a computer arrangement comprising a processing unit and a memory. The computer program product, after being loaded, provides the processing unit with the capability to carry out the rendering, tasks.

FIG. 4 schematically shows an embodiment of the image acquisition system 400 employing the adaptation system 300 of the invention, said image acquisition system 400 comprising an image acquisition system unit 410 connected via an internal connection with the adaptation system 300, an input connector 401, and an output connector 402. This arrangement advantageously increases the capabilities of the image acquisition system 400 providing said image acquisition system 400 with advantageous segmentation capabilities of the adaptation system 300. Examples of image acquisition systems are, but not limited to, a CT system, an X-ray system, an MRI system, an Ultrasound system, a Positron Emission Tomography (PET) system, and a Single Photon Emission Computed Tomography (SPECT) system.

FIG. 5 schematically shows an embodiment of the workstation 500. The system comprises a system bus 501. A processor 510, a memory 520, a disk input/output (I/O) adapter 530, and a user interface (UI) 540 are operatively connected to the system bus 501. A disk storage device 531 is operatively coupled to the disk I/O adapter 530. A keyboard 541, a mouse 542, and a display 543 are operatively coupled to the UI 540. The adaptation system 300 of the invention, implemented as a computer program, is stored in the disk storage device 531. The workstation 500 is arranged to load the program and input data into memory 520 and execute the program on the processor 510. The user can input information to the workstation 500 using the keyboard 541 and/or the mouse 542. The workstation is arranged to output information to the display device 543 and/or to the disk 531. The skilled person will understand that there are numerous other embodiments of the workstation known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the system claims enumerating several units, several of these units can be embodied by one and the same item of hardware or software. The usage of the words first, second and third, et cetera does not indicate any ordering. These words are to be interpreted as names.

The invention claimed is:

1. An adaptation method of adapting a geometric model that includes a first part, a second part and a transition region between the first part and the second part to image data executed by a hardware processor of an adaptation system, comprising:
   determining, by the hardware processor, a first partial transformation for mapping the first part of the geometric model into the image data;
   determining, by the hardware processor, a second partial transformation for mapping the second part of the geometric model into the image data, wherein the first and second partial transformations, when applied, create an adapted geometric model based on the geometric model;
   optimizing, by the hardware processor, the first and second partial transformations to maintain consistency of the adapted geometric model in the transition region between the first part and the second part of the geometric model; and
   applying, by the hardware processor, the first partial transformation and the second partial transformation.

2. An adaptation method as claimed in claim 1 wherein a cost function is a function of the first partial transformation and of the second partial transformation and wherein the optimizing of the first partial transformation and the second partial transformation is based on optimizing the cost function.

3. An adaptation method as claimed in claim 2 wherein the cost function is a function of a global transformation.

4. An adaptation method as claimed in claim 1 wherein the transition region is comprised in the intersection of the first part and of the second part and wherein the optimizing step comprises determining a global transformation in the transition region on basis of the first partial transformation and of the second partial transformation.

5. An adaptation method as claimed in claim 1 further comprising constructing a global transformation for mapping the geometric model into the image data using the first partial transformation and the second partial transformation.

6. An adaptation method as claimed in claim 1 wherein the second part of the geometric model comprises a tubular structure and the second partial transformation is defined on basis of a shaping partial transformation for shaping a centerline of the tubular structure and/or or of a scaling partial transformation for scaling the radius of a cross-section of the tubular structure.

7. An adaptation method as claimed in claim 1 wherein the first partial transformation is an affine partial transformation.

8. An adaptation method as claimed in claim 1 further comprising a segmenting step for segmenting the image data.

9. An adaptation system including a hardware processor for adapting a geometric model that includes a first part, a second part and a transition region between the first part and the second part to image data, the adaptation system comprising:
   an optimizing unit implemented by the hardware processor and configured to determine a first partial transformation for mapping the first part of the geometric model into the image data and a second partial transformation for mapping the second part of the geometric model into the image data, wherein the first and second partial transformations, when applied, create an adapted geometric model based on the geometric model, the optimizing unit further configured to optimize the first and second partial transformations to maintain consistency of the adapted geometric model in the transition region between the first part and the second part of the geometric model; and
   an adapting step unit implemented by the hardware processor and configured to apply the first partial transformation and the second partial transformation.

10. An image acquisition system for acquiring an image data and adapting a geometric model that includes a first part, a second part and a transition region between the first part and the second part to the image data, comprising:
   an image acquisition system unit including hardware components for acquiring the image data; and
   an adaptation system for adapting the geometric model to the image data comprising an optimizing unit for determining a first partial transformation for mapping the first part of the geometric model into the image data, wherein the first partial transformation, when applied, creates an adapted geometric model based on the geometric model, the adaptation system further optimizing the first partial transformation to maintain consistency of the adapted geometric model in the transition region between the first part and the second part of the geometric model, and a second partial transformation for mapping the second part of the geometric model into the image data; and
   an adapting step unit for applying the first partial transformation and the second partial transformation.

11. A workstation comprising:
   a processor;
   a memory;
   a user interface; and
   an adaptation system for adapting a geometric model that includes a first part, a second part and a transition region between the first part and the second part to an image data comprising an optimizing unit for determining a first partial transformation for mapping the first part of the geometric model into the image data, wherein the first partial transformation, when applied, creates an adapted geometric model based on the geometric model, the adaptation system further optimizing the first partial transformation to maintain consistency of the adapted geometric model in the transition region between the first part and the second part of the geometric model, and a second partial transformation for mapping the second part of the geometric model into the image data; and
   an adapting step unit for applying the first partial transformation and the second partial transformation.

12. A computer program embodied on a non-transitory computer readable medium product to be loaded by a computer arrangement, comprising instructions for adapting a geometric model that includes a first part, a second part and a transition region between the first part and the second part to an image data, the computer arrangement comprising a processing unit and memory, the computer program product, after being loaded, providing said processing unit with the capability to:
   determine a first partial transformation for mapping the first part of the geometric model into the image data and a second partial transformation for mapping the second part of the geometric model into the image data, wherein the first and second partial transformations, when applied, create an adapted geometric model based on the geometric model;
   optimize the first and second partial transformations to maintain consistency of the adapted geometric model in the transition region between the first part and the second part of the geometric model; and
   apply the first partial transformation and the second partial transformation.

* * * * *